Figure 1:
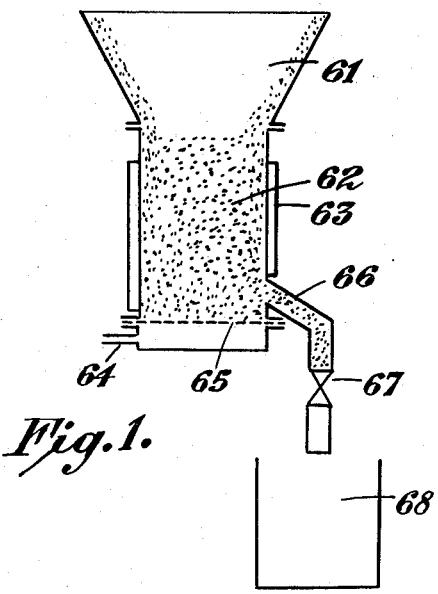

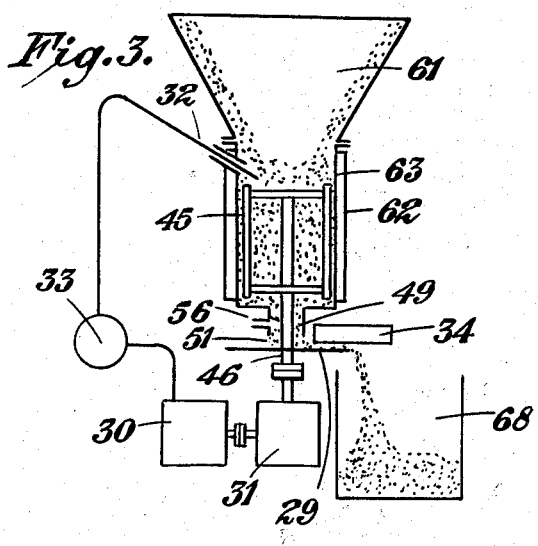
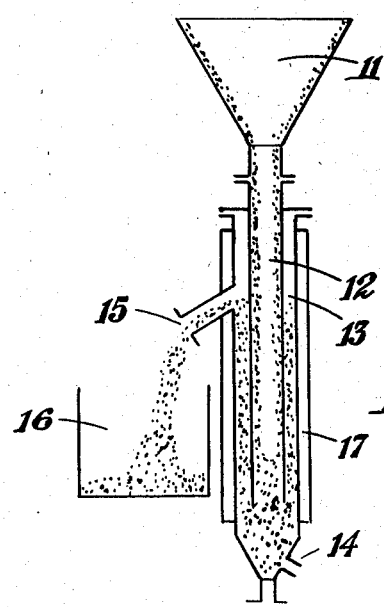

United States Patent Office 2,943,704
Patented July 5, 1960

2,943,704

DISCHARGE OF SOLIDS PRECIPITATED FROM CHLORINATION GASES

William Henry Coates, Holmdene, Eaglescliffe, Stockton-on-Tees, and John Hayden, Middlesbrough, England, assignors to British Titan Products Company Limited, a British company Filed Nov. 23, 1956, Ser. No. 624,001

Claims priority, application Great Britain Nov. 28, 1955

6 Claims. (Cl. 183—119)

The invention relates to the discharge of solids precipitated from gases derived from the chlorination of ferro-titaniferous ores.

The chlorination of titaniferous and ferro-titaniferous ores may be conducted in various ways of which the admission of chlorine through a mixture of the ore and carbon previously briquetted and fed to a shaft furnace, or through a bed of such mixture maintained in a fluidized state, has been the more popular since it permits a process which can be autothermal. In almost all cases the gases and vapours are generated from the furnace at elevated temperatures, i.e. above 300° C., and usually at temperatures varying from 600–900° C. They comprise titanium tetrachloride vapour, varying proportions of carbon monoxide and carbon dioxide and possibly, according to the degree of chlorination efficiency, quantities of free chlorine. Other gases resulting from the presence of impurities may include hydrochloric acid. There will also be varying quantities of other chloride vapours depending on the metals present in the ore and their relative ease of attack. Of these the most common is iron which may be present in the form of ferrous or ferric chloride. Other chlorides which may be present include those of chromium, vanadium, zirconium, niobium, silicon, aluminium, magnesium and traces of manganese, molybdenum, cobalt, copper, indium and thorium. In addition the gases and vapours will usually have in suspension by entrainment, fine particles of ash residues from the ore and carbon.

General practice favours the chlorination of all the chlorinatable material and the subsequent separation of the principal constituents, but processes have been described in which preferential chlorination is effected and particularly where the iron constituent is removed prior to the formation of the titanium chloride.

As a stage in the recovery of titanium tetrachloride from the products emanating from such chlorination processes as aforesaid, cooling may be applied so that the titanium tetrachloride and certain other chlorides are retained in the vapour phase while other vapours are condensed and removed together with at least some of the entrained solids.

The cooling may be controlled as in the manner described in co-pending United States application Serial No. 617,184 so that the condensate is substantially free flowing solid material. The deposition then occurs in the chilling vessel or in the subsequent cyclones and separators where the solid falls to the bottom and is ready for removal or collection. It has been found, however, that this material presents difficulties in discharge due to the plant normally operating somewhat above atmospheric pressure and consequently ejecting the titanium chloride and other vapours with the solids. In an endeavour to solve these problems it has been found if conventional air-locks such as a rotating star valve or similar devices are used that these are not sufficiently gas-tight to prevent the egress of titanium tetrachloride vapours. Furthermore, if the above mentioned problems could be overcome, there is still the difficulty of handling a solid which has titanium tetrachloride entrained with it. Additionally, solids contaminated with even small amounts of titanium tetrachloride are difficult to handle when they come in contact with moist air causing blockages and other well known undesirable corrosive conditions. Furthermore, in the discharge of such solids by previous methods there has been considerable difficulty in preventing condensation of liquid titanium chloride taking place, for even though external heating may have been applied, the heat transfer to the mass was insufficiently rapid to maintain it at temperatures at which condensation could be inhibited.

The object of the present invention is to overcome or minimize these difficulties.

This object is achieved by cooling gases and vapours which have been produced by the chlorination of titaniferous ores so that titanium tetrachloride is retained in the vapour phase whilst entrained solids and substances condensed to solids by the cooling are precipitated in a substantially free flowing state, and removing the condensed solids, whilst maintaining their temperature at an appropriate level, with an innocuous gas so as to drive back and thus prevent egress of titanium tetrachloride and other accompanying vapours and gases. This step has the further advantage that it may be performed so that any lumps or aggregates of the solid material will not clog the discharge outlet.

Figures 1 to 4 of the accompanying diagrammatic drawings, each in sectional elevation, show forms of apparatus which may be used in carrying out the process of the invention:

The apparatus of Figure 1 shows a conical bottom 61 of a solids separator (not shown) discharging into a vessel 62, where a bed of solids collects. The bed is fluidized by means of dry air admitted through a pipe 64 and through a perforated plate 65. This fluidized state enables heat, supplied by a steam jacket 63, to be rapidly and uniformly distributed throughout the bed, the temperature of the bed being by this means maintained sufficiently high to prevent condensation of any titanium chloride which may come into the bed.

At the side near the bottom of the vessel 62 is a downwardly inclined discharge conduit 66 leading through a manually operable gate valve 67 to a collector 68. It will be noted that the discharge conduit is, practically speaking, out of the path of the upwardly rising stream of air.

In operation an air flow is maintained continuously. Solids collect in the vessel 62 to form the bed as shown which is fluidized and purged of entrained vapours of titanium chloride. The valve 67 is then opened and kept open until the bed level has fallen so low that the discharge of solids through the conduit 66 has ceased or nearly ceased. The valve is then closed and the cycle is repeated.

An indication of the level of the bed of solids in the vessel may be obtained by noting the pressure of the air in the pipe 64 which is, of course, related to the height of solids above the plate 65.

Figure 2:
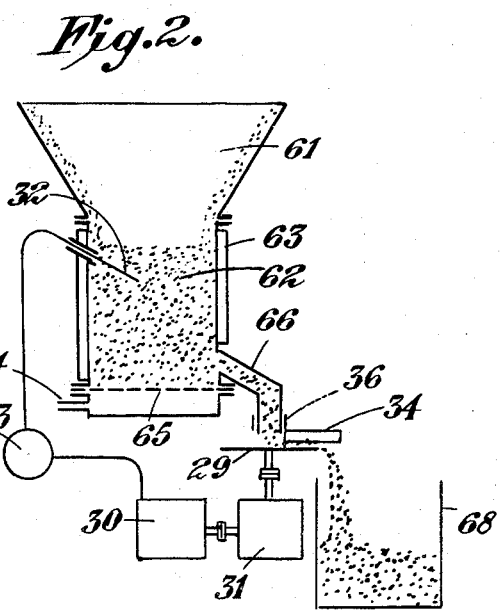

The apparatus of Figure 2 is generally similar to that of Figure 1 except that it provides automatic means for operating the discharge of solids. The parts in Figure 2 which are the same as those in Figure 1 are correspondingly numbered. The following is a description of the parts included in the apparatus for automatic regulation of discharge:

The discharge conduit 66 opens above the centre of a horizontal rotatable table 29 which is operated by an electric motor 30 through a gear box 31. The operation of the motor is governed by a relay control 33 adapted to be actuated by an electric switch 32 which is responsive to the level of the bed of solids in the vessel 62. That is to say, when the bed rises to a certain level in the proximity of the responsive element of the switch 32, the switch is put into operation and thereby causes the motor 30 to run and thus rotate the table 29. This causes solids to move out of the discharge conduit 66 and to fall via the table into the collector 68, the solids being removed from the rotating table by a scraper 34. It will be noted that on the vertical part of the discharge conduit 66 there is an adjustable sleeve 36 for controlling the gap between the outlet of the discharge conduit and the rotating table 29, thus regulating the rate of discharge.

It will be appreciated that although Figure 2 shows the discharge by a table supporting the static leg of solids, other conventional methods of discharge such as a star valve or screw could be substituted at this point and could be operated by means of the automatically controlled motor 30. As in the case of Figure 1 the bed of solids in the vessel 62 is fluidized by air or other gas admitted through the pipe 64, which also serves to purge the discharged solids of undesired fumes.

The apparatus shown in Figure 3 is in some respects similar to that shown in Figure 2 and like parts are correspondingly numbered. However in the case of Figure 3 the bed of solids in the vessel 62 is not fluidized but is mechanically agitated as and when required. The discharge conduit marked 49 passes vertically out of the bottom of the vessel 62 and the rotatable discharge table 29 is mounted immediately under the outlet of the conduit 49. The vessel 62 is provided with an agitator 45 carried by a shaft 46 which also carries the discharge table 29. The motor 31 rotates the agitator 45 and the discharge table 29 so as to facilitate the removal of the solids in the vessel by suitable agitation inside the vessel whilst the scraper 34 removes the solids from the table 29 into the collector 68. At the same time the agitation enhances heat transfer to the solids from the steam jacket 63. Whether the motor 31 is operating or not, dry air or other gas is admitted through a pipe 56 so as to pass up through the bed of solids in the vessel 62 and thereby remove titanium tetrachloride and other undesirable fumes prior to discharge of the solids. The admitted gas does not, however, in this case serve to fluidize the bed of solids.

The apparatus shown in Figure 4 is of a somewhat simplified form applicable for continuous operation when the solid material to be discharged does not comprise relatively large lumps and aggregates. In Figure 4 a conical bottom 11 of a separator is connected to a conduit 12 so as to form a funnel by which the solid material is discharged from the separator. The conduit 12 discharges into a vessel 13 and by means of dry air admitted through an inlet 14 near the bottom of the vessel, the solids in the vessel are fluidized and discharged via an outlet 15 into a collector 16. The vessel 13 is steam-jacketed at 17 to maintain the solids at a temperature high enough to prevent condensation of the titanium tetrachloride. Again by means of this apparatus the air admitted for fluidizing the bed of solids in the vessel 13 deprives the solids of any entrained titanium tetrachloride vapours and, in consequence, when discharged into the collector 16 they are free from objectionable fumes.

It should be borne in mind that in the operation of this particular form of apparatus shown in Figure 4, if large pieces of solid matter are periodically deposited at the bottom of the vessel 13, the fluidizing will ultimately be interfered with and the free discharge of the solids will be arrested.

The dry air or other gas (e.g. nitrogen, helium or argon, as such or together with air) required for fluidizing in Figures 1, 2 and 4, and for purging in all of the Figures 1 to 4, is negligible compared with the total gas flow through the condensing system. Hence the dilution of the main chlorination gases as a result of employing any of the forms of apparatus is unimportant.

The following are given as examples to illustrate further the working of the invention:

*Example 1*

The hot gases derived from the high temperature chlorination of mineral rutile in a fluid bed reactor were admitted to a primary cooling vessel into which liquid titanium tetrachloride was sprayed so that the temperature of the gases was reduced to 320° C. The total volume of the gases passing out of the cooling vessel was 550 cubic feet per minute with a pressure inside the vessel of 20 inches water gauge. Under these conditions 10 kgs. of solid per hour consisting of fine ash and coke dust swept out of the chlorinator and some solid chlorides condensed at this temperature were deposited in the conical base of the vessel.

From the conical base 61 of the cooling vessel these solids passed into the steam jacketed vessel 62 of the solids discharge device as depicted in Figure 1. The bed of solids in the vessel 62 was maintained in a fluidized state by admitting air at the rate of 2 cubic feet per minute through the pipe 64 and thence through the distribution plate 65. When the height of the fluidized solids bed in the vessel 62 had reached a predetermined level the valve 67 was opened and the solids were discharged into the collector 68. The valve 67 was then closed and the cycle repeated, the fluidizing and purging air being continuously admitted.

The discharge product had a particle size such that all passed through a 100 B.S.S. mesh screen and 95% was retained on 200 mesh screen. These solids were completely free from fume and during the whole operation the fluidized solids bed in the vessel 62 maintained an effective seal and there was no leakage of titanium tetrachloride.

It will be understood that substantially the same result is obtained when the process as described in the example is used with the apparatus shown in Figure 2, the conditions of operation being the same except for the use of automatic means instead of manual means for controlling the discharge.

*Example 2*

In the same chlorination plant the gases discharged from the primary cooler passed to a settling chamber where they were further cooled to a temperature of 170° C. In this chamber the iron chlorides and other normally solid chlorides were condensed and deposited in the conical base 41 of the chamber to which was attached a solids discharge device as depicted in Figure 3.

From the base of the settling chamber 61 the deposited solids passed into the steam jacketed vessel 62 of the discharge device. In this way a bed of solids was built up to a certain level predetermined by the level-responsive switch 32 which caused the horizontal table 29 and the agitator 45 to be rotated and enabled the discharge of solid by scraper 34 into the collector 68 at the rate of 3 kgs. per hour. At the same time dry air admitted through the pipe 56 at the rate of 0.3 cubic foot per minute enabled the removal of the titanium tetrachloride and other gaseous vapours from the solids prior to their discharge. The discharged solids were finer than in Example 1, approximately 60% passing through a 200 B.S.S. mesh screen. The pressure inside the settling chamber was 19 inches water gauge but the solids discharged were free from fume and the bed of solids in the apparatus provided an effective seal against any leakage of titanium tetrachloride. The small amount of dry air admitted to purge the bed of solids produced no significant change in the composition of the chlorination gases.

In the embodiments described above, the gas used for fluidizing the iron chloride is dry air. This is an especially effective gas for the purpose since it is comparatively inert to the iron chloride at the temperature at which it is solid (below 600° C.). It will also be understood that other gases which are essentially inert to iron chloride can be used in lieu of or in conjunction with dry air. For example, the conventional well-known inert gases, such as nitrogen, helium and argon, may be used for this purpose.

In the various embodiments illustrated above, it will be seen that in the practice of the process, the condensed iron chloride is best supplied to a bed which is porous or permeable to the flow of gas and that such bed serves effectively as a seal to isolate the condenser system, which is connected to the conduit for supply of the iron chloride to the discharge system, from the outside atmosphere or the atmosphere into which the iron chloride is ultimately to be discharged. By passage of gas through this permeable bed, titanium tetrachloride and like vapors are swept from the bed. Consequently, so long as the iron chloride in the bed is removed therefrom at a point out of the path of the upwardly rising stream of gas, little or no gas flows through the outlet for the iron chloride.

It will be also understood that the process described above may be used for removal of other normally solid metal chlorides from a condensing system. For example, mixed chlorides may be formed by chlorination of chromium bearing ores and condensed to solid state and withdrawn as herein contemplated. Zirconium tetrachloride and like chlorides which vaporize at a temperature above about 100° C. but which are solid at room temperature (25–35° C.) also may be recovered in the same manner.

We claim:

1. In a method of preparing a normally solid metal chloride by chlorination of a metal bearing material in a chlorination zone whereby to form the metal chloride in vapor state dispersed in the gases produced by the chlorination, the improvement which comprises condensing the metal chloride to solid state in a condensing zone to form a suspension of solids comprising solid metal chloride in the chlorination gases, precipitating the suspended solids from the suspension, forming a porous bed of said solids adjacent the condensing zone, conducting the solids precipitated from the suspension to one portion of the bed, passing inert gas through the bed so as to purge a major portion of said solids of chlorination gases while keeping the bed temperature high enough to prevent liquid condensation of gases in the bed, and withdrawing solids from another portion of bed which has been purged of chlorination gases.

2. In a method of preparing titanium tetrachloride by chlorination of an iron-titanium bearing material whereby to form a vaporized mixture of iron chloride and titanium tetrachloride dispersed in the gases produced by the chlorination, the improvement which comprises selectively condensing the iron chloride to solid state in a condensing zone thereby forming a suspension of solids comprising solid iron chloride in chlorination gases comprising titanium tetrachloride, precipitating the solids from the suspension, forming a porous bed of said solids adjacent to and communicating with the condensing zone, conducting the solids precipitated from the suspension to one portion of the bed, passing inert gas through the bed so as to purge a major portion of said solids of chlorination gases while maintaining the temperature of the porous bed high enough to prevent liquid condensation of gases in the bed, and withdrawing solids from another portion of the bed which has been purged of chlorination gases.

3. The method of claim 1 wherein the porous bed communicates with the condensing zone.

4. The method of claim 1 wherein the inert gas is dry air.

5. The method of claim 1 wherein the solids in the porous bed are fluidized in an upwardly rising stream of inert gas.

6. The method of claim 5 wherein the purged solids are withdrawn from the bed at a point out of the path of the upwardly rising stream of inert gas.

References Cited in the file of this patent

UNITED STATES PATENTS

| | | |
|---|---|---|
| 2,427,341 | Alther | Sept. 16, 1947 |
| 2,580,635 | Winter | Jan. 1, 1952 |
| 2,675,889 | Frey | Apr. 20, 1954 |
| 2,675,891 | Frey | Apr. 20, 1954 |